(No Model.)
M. DEPREZ & J. CARPENTIER.
TRANSMISSION OF ELECTRICAL ENERGY TO A DISTANCE.
No. 470,865. Patented Mar. 15, 1892.
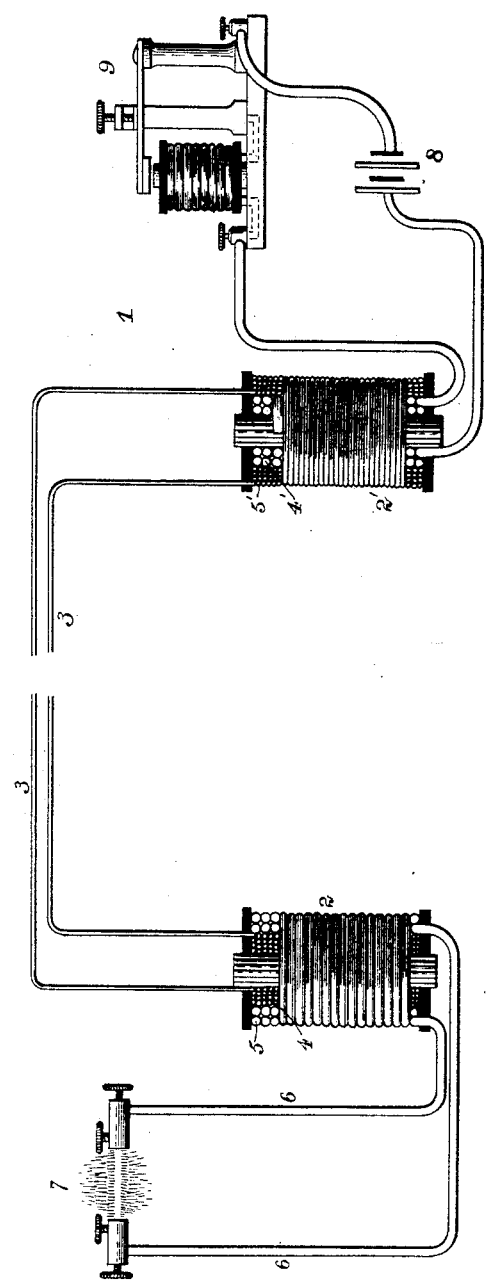

UNITED STATES PATENT OFFICE.

MARCEL DEPREZ AND JULES CARPENTIER, OF PARIS, FRANCE; SAID CARPENTIER ASSIGNOR TO SAID DEPREZ.

TRANSMISSION OF ELECTRICAL ENERGY TO A DISTANCE.

SPECIFICATION forming part of Letters Patent No. 470,865, dated March 15, 1892.

Application filed November 27, 1888. Serial No. 292,016. (No model.) Patented in France April 5, 1881, No. 142,140, and in England September 24, 1881, No. 4,128.

*To all whom it may concern:*

Be it known that we, MARCEL DEPREZ and JULES CARPENTIER, citizens of the Republic of France, and both residing at Paris, France, have invented certain new and useful Improvements in Transmission of Electrical Energy to a Distance, (for which we have obtained a patent in France, No. 142,140, bearing date April 5, 1881, and a patent in Great Britain, No. 4,128, bearing date September 24, 1881,) of which the following is a specification.

Our invention has for its main object the transmission of electricity to a distance, whereby the loss of power during the transit is rendered as small as possible. This invention is based upon a fact which one of us (MARCEL DEPREZ) has discovered. If through the thick wire of a Ruhmkorff coil a "quantity current" of electricity is passed, coming, for instance, from one or more Bunsen elements, a "tension-current" of electricity is produced in the small wire, which current can overcome great resistance and can be sent to a very great distance without a sensible loss of power. If then, this tension-current is received at the other end of its path in a second coil, it generates in the thick wire a quantity-current which has very nearly the same energy as the quantity-current which has acted upon the first coil. The Ruhmkorff coil is thus reversible. In this manner a wire of platinum located at the distance of several hundred kilometers can be made red-hot with two Bunsen elements, while it would require a very great number of elements for obtaining the same result if the connection between the battery and the wires were direct, for quantity electricity loses much of its energy, and that very promptly, if a great resistance is opposed to it. Thus by transforming electricity of quantity into electricity of tension by means of an induction-coil we have been able to transmit electricity to a distance, the electricity thus transmitted being employed either in the form of electricity of tension or in the form of electricity of quantity by making use of a coil at the receiving-station. The successive electric currents upon the line and in the circuit at the distant station thus produced are not only alternating, but also equal in duration and strength, and they follow each other without sensible interruptions. As distinguished from currents used in the transmission of telegraphic signals or telephonic messages which are variably pulsating or undulating and intermittent, they are practically uniform and continuous, and in order to distinguish the currents generated and utilized by our method from such telegraphic or telephonic currents they will hereinafter be referred to as "maintained and practically uniform currents." The novel feature of our invention therefore consists in sending over a line to a distant point maintained and practically uniform currents of high tension and comparatively small quantity, through a primary coil of many convolutions, and thereby generating by induction, similar currents of lower tension and greater quantity in a secondary coil of a lesser number of convolutions. The low-tension currents thus generated at a distant point we utilize for any of the purposes for which these currents may be used, as for electric heating or lighting or any similar use requiring the employment of maintained and practically uniform currents, and we can thus transmit to a distance a great amount of electrical energy by means of line conductors of small cross-section, for it is well known that currents of high tension will overcome great resistances without serious loss and without unduly heating the conductors.

In the accompanying drawing, which forms a part of this specification, we have illustrated some of the apparatus which may be used for practicing our invention; but it will be understood that we are not limited to the particular devices shown, since our invention may be practiced by greatly-varying apparatus without departing from the fundamental principle of the same.

In the drawing we illustrate the apparatus used by us in the demonstration of the fundamental idea of our invention, clearly showing the reversibility of the Ruhmkorff coil, and constituting an effective apparatus for practicing our invention.

A generator 1 of alternating currents of high tension is located at one station, and a Ruhmkorff or other suitable inductorium 2 is located at a distant station, the two being connected by line conductors 3 3, which include in circuit the primary coil 4 of the inductorium at the distant station. This primary coil is preferably made of fine wire and has a great number of convolutions, and the alternating currents of high tension generated in the generator 1 and passing over the line also pass through the convolutions of the primary coil. The secondary coil 5 of the inductorium is made of a comparatively small number of convolutions and is preferably made of a much thicker wire than the primary coil, and the high-tension currents in the primary generate inductively in the secondary coil currents of much lower tension and of great quantity. In the external circuit 6 6 of the secondary coil suitable translating devices 7 are included, requiring the employment of maintained and practically uniform currents, and these translating devices are represented in the drawing as a platinum wire stretched between binding-posts or clamps. The generator of alternating high-tension currents is shown as composed of a Ruhmkorff coil 2', having a short thick wire primary coil 4', connected in circuit with a battery 8 and a rheotome 9, of ordinary construction, while the long fine-wire secondary coil 5' is connected with the line conductors 3 3. The ordinary operation of the Ruhmkorff inductorium being well understood, it will be clear that the current from the battery being rendered intermittent by the action of the rheotome, these intermittent impulses passing through the short and thick primary coil 4' will generate in the long and fine secondary 5' maintained and practically uniform alternating currents of much higher tension, but of less quantity. The secondary coil 5' thus becomes the seat of the high-tension alternating currents, which are sent to the distant station to be converted into currents of low tension and great quantity by the inverse action of the reversed inductorium. The platinum wire 7 at the remote station being heated by the maintained and practically uniform low-tension quantity-currents from the secondary coil 5 may serve as a source of heat or light, or both, and we have thus been enabled to render a piece of platinum wire red-hot at a distance of several hundred kilometers from the source of high-tension currents, employing for the generation of the latter only two Bunsen cells. To produce the same effect by direct transmission of electrical energy, a battery of a great number of cells is required. Thus it will be seen that by our system of transmitting electrical energy to a distance, the currents traversing the line conductors are of high tension and comparatively small quantity, and the line-conductors may therefore be made quite small and inexpensive, while the amount of energy which can be transmitted to great distances by such conductors is practically unlimited.

Having now fully described our invention, we claim and desire to secure by Letters Patent—

1. The improvement in the art of transmitting electrical energy to and utilizing it at a distance from the source, which consists in generating maintained and practically uniform currents of high tension at one station and sending the same over a line of conductors to another station, and generating maintained and practically uniform currents of lower tension at the second station by the inductive influence of the high-tension currents, substantially as described.

2. The improvement in the art of transmitting electrical energy to and utilizing it at a distance from the source, which consists in generating maintained and practically uniform currents of high tension at one station and sending the same over a line of conductors to another station, generating maintained and practically uniform currents of lower tension at the second station by the inductive influence of the high-tension currents, and converting these maintained low-tension currents into other forms of energy, such as heat, light, &c., substantially as described.

3. The improvement in the art of transmitting electrical energy to and utilizing it at a distance from the source, which consists in generating maintained and practically uniform alternating currents of high tension at one station and sending the same over a line of conductors to another station, and generating maintained and practically uniform alternating currents of lower tension at the second station by the inductive influence of the high-tension currents, substantially as described.

4. The improvement in the art of transmitting electrical energy to and utilizing it at a distance from the source, which consists in generating maintained and practically uniform alternating currents of high tension at one station and sending the same over a line of conductors to another station, generating maintained and practically uniform alternating currents of lower tension at the second station by the inductive influence of the high-tension currents, and converting these maintained low-tension alternating currents into other forms of energy, such as heat, light, &c., substantially as described.

In testimony whereof we have signed our names to this specification in the presence of two subscribing witnesses.

MARCEL DEPREZ.
   JULES CARPENTIER.

Witnesses:
 R. J. PRESTON,
 ALBERT COHENE.